April 22, 1952     M. LUDEWIG     2,593,904
IMAGE-INVERTING OPTICAL SYSTEM
Filed Jan. 31, 1950
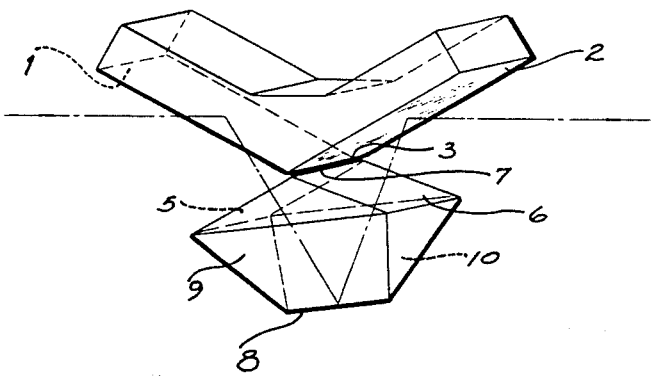
INVENTOR.
Max Ludewig
BY Fred A. Klein
Attorney.

Patented Apr. 22, 1952

2,593,904

UNITED STATES PATENT OFFICE 2,593,904

IMAGE-INVERTING OPTICAL SYSTEM

Max Ludewig, Wetzlar, Germany, assignor to Ernst Leitz, G. m. b. H., Wetzlar, Germany, a corporation of Germany Application January 31, 1950, Serial No. 141,510
In Germany August 1, 1949

6 Claims. (Cl. 88—1)

The present invention relates to an optical system, and more particularly to a direct-vision, image-inverting optical system. The system according to this invention is similar in function to optical systems with four reflections, as for example Abbé's inverting prism.

Heretofore, optical systems of this kind have used a series of prisms which are either cemented together or separated from one another by an air gap. It has also been proposed to use different types of glass for the prisms forming the system. By displacement and angle variations of the prisms in relation to each other, it was possible to compensate for or cause deviations of the incident and emergent axes. However, the known systems of this type have several disadvantages. Their glass path is long and hence the overall length of optical instruments embodying such systems, as for example telescopes, becomes excessive. The use of a number of prisms also imparts considerable weight to the instrument due to the great amount of glass used. In addition, it involves high production costs because of the required number of polished surfaces.

It is an object of the present invention to provide a direct-vision, image-inverting optical system being simple in construction and use.

It is a further object of this invention to provide an optical system of the type described which has a short glass path.

It is also an object of the invention to provide an optical system of the above type which is economical in its use of glass.

The above and other objects of the invention, which will become more apparent in the description of one embodiment thereof hereinafter, are accomplished by constructing an optical system comprising two reflecting surfaces or mirrors arranged to form a roof and in juxtaposition to the roof edge formed by said mirrors, a reflecting prism whose incident and emergent surfaces also form a roof, the roof edge formed by the mirrors and that formed by the transmitting prism surfaces being parallel to each other.

Referring now to the single figure of the drawing, reflecting surfaces 1 and 2, which are part of one single body, form a roof having roof edge 3. Arranged in juxtaposition to roof edge 3 is roof prism 4 whose incident surface 5 and emergent surface 6 also form a roof having edge 7. The image-inverting roof edge 8 of roof prism 4 is formed by the prism surfaces 9, 10. The roof edge 8 extends substantially in the direction of the principal axis and may be arranged more or less inclined relative thereto, depending upon whether an axis displacement is desired or is to be eliminated.

The system shown in this embodiment comprises two bodies which can be simply supported so that the two bodies may be pivoted relative to one another around roof edge 3 or 7, respectively, by adjusting means known per se (not shown). In this manner, the roof prism 4 may be displaced relative to the stationary mirror body 1, 2 around the roof edge 7, the mirror body 1, 2 may be pivoted around the roof edge 3 relative to the stationarily arranged roof prism 4. Roof edges 3 and 7 may be constructed as intermeshing joints, like a knife-edge joint for example.

While the invention has been described with reference to the single embodiment shown in the drawing, it is to be understood that the same has been given merely for the purpose of illustration and not as a limitation, and that the spirit and scope of the invention is as defined in the appended claims.

What is claimed is:

1. A direct-vision, image-inverting optical system with four reflecting surfaces of the type of Abbé's inverting prism system, comprising a first optical member having two plane surface mirrors arranged at an angle to each other and forming an intersecting edge, and a second optical member consisting of a back-viewing roof prism spaced from said first optical member and having transparent incident and emerging surfaces also arranged at an angle to each other and forming another intersecting edge, said two edges being arranged juxtaposed and parallel to each other, at least one of said optical members being arranged pivotally around at least one of said edges as an axis, and each of said optical members being pivotable independently with respect to the other member.

2. A prism system as defined in claim 1, wherein each of the optical members is arranged pivotally around its respective intersecting edge as an axis.

3. A prism system as defined in claim 1, wherein said incident and emerging surfaces of the roof prism are of approximately the same size as the parallel projection in the reflecting direction of the corresponding reflecting surface.

4. A direct-vision, image-inverting optical system with four reflecting surfaces of the type of Abbé's inverting prism system, comprising a first optical member having two plane surface mirrors arranged at an angle to each other and forming an intersecting edge, and a second optical member consisting of a back-viewing roof prism spaced from said first optical member and having transparent incident and emerging surfaces arranged at an angle to each other and forming another intersecting edge, said two edges being parallel to each other and forming an intermeshing joint whereby either optical member may be pivotally moved about the other independently from the other.

5. A direct-vision, image-inverting optical system with four reflecting surfaces of the type of Abbé's inverting prism system, comprising a first optical member having two plane surface mirrors arranged at an angle to each other and forming an intersecting edge, and a second optical member consisting of a back-viewing roof prism spaced from said first optical member and having transparent incident and emerging surfaces arranged at an angle to each other and forming another intersecting edge, said two edges being parallel to each other and forming an intermeshing joint whereby both optical members may be pivotally moved about the other independently from each other.

6. In a telescoope, at least one direct-vision, image-inverting optical system with four reflecting surfaces of the type of Abbé's inverting prism system, comprising a first optical member having two plane surface mirrors arranged at an angle to each other and forming an intersecting edge, and a second optical member consisting of a back-viewing roof prism spaced from said first optical member and having transparent incident and emerging surfaces arranged at an angle to each other and forming another intersecting edge, said edges being arranged juxtaposed and parallel to each other, at least one of said optical members being arranged pivotally around at least one of said edges as an axis and each of said optical members being pivotable independently with respect to the other member.

MAX LUDEWIG.

REFERENCES CITED

The following references are of record in the file of this patent:

UNITED STATES PATENTS

| Number | Name | Date |
|---|---|---|
| 586,708 | Hastings | July 20, 1897 |
| 2,410,757 | Street | Nov. 5, 1946 |